(12) United States Patent
Zamsky et al.

(10) Patent No.: US 11,178,054 B1
(45) Date of Patent: Nov. 16, 2021

(54) METHOD AND APPARATUS FOR LONGEST PREFIX MATCH SEARCH

(71) Applicant: Marvell Israel (M.I.S.L) Ltd., Yokneam (IL)

(72) Inventors: Ziv Zamsky, Raanana (IL); Ilan Mayer-Wolf, Tel-Aviv (IL); Yakov Tokar, Rishon LeTsiyon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 96 days.

(21) Appl. No.: 16/548,595

(22) Filed: Aug. 22, 2019

Related U.S. Application Data

(60) Provisional application No. 62/721,413, filed on Aug. 22, 2018.

(51) Int. Cl.
*H04L 12/745* (2013.01)
*G06F 16/22* (2019.01)

(52) U.S. Cl.
CPC ........ *H04L 45/748* (2013.01); *G06F 16/2246* (2019.01)

(58) Field of Classification Search
CPC ........................... H04L 45/748; G06F 16/2246
USPC ......................................... 370/392, 256, 255
See application file for complete search history.

(56) References Cited

U.S. PATENT DOCUMENTS

| | | | |
|---|---|---|---|
| 6,697,363 B1 | 2/2004 | Carr | |
| 7,212,531 B1 | 5/2007 | Kopelman et al. | |
| 7,539,153 B1 * | 5/2009 | Liang | H04L 45/00 370/255 |
| 7,613,189 B1 * | 11/2009 | Kopelman | H04L 45/00 370/392 |
| 9,819,637 B2 | 11/2017 | Roitshtein et al. | |
| 2004/0008634 A1 * | 1/2004 | Rangarajan | H04L 45/7457 370/256 |
| 2014/0244779 A1 * | 8/2014 | Roitshtein | H04L 45/748 709/213 |

* cited by examiner

*Primary Examiner* — Kwang B Yao
*Assistant Examiner* — Syed M Bokhari

(57) ABSTRACT

A network device includes a memory configured to store a plurality of entries in respective locations in the memory, the plurality of entries corresponding to a trie data structure for performing a longest prefix match search. The network device also includes: a memory access engine configured to retrieve from a location in the memory, in a single memory lookup operation, i) longest prefix match information for a node corresponding to a network address in a header of a packet, and ii) pointer information that indicates a child node in the trie data structure. The network device also includes: a child node address calculator configured to use i) the longest prefix match information, and ii) the pointer information, to calculate a memory address of another location in the memory corresponding to the child node.

19 Claims, 12 Drawing Sheets

METHOD AND APPARATUS FOR LONGEST PREFIX MATCH SEARCH

CROSS REFERENCES TO RELATED APPLICATIONS

This application claims the benefit of U.S. Provisional Patent App. No. 62/721,413, entitled "Longest Prefix Match (LPM) Algorithm," filed on Aug. 22, 2018, the disclosure of which is hereby expressly incorporated herein by reference in its entirety.

FIELD OF TECHNOLOGY

The present disclosure relates generally to communication networks, and more particularly to longest prefix match techniques for determining a next hop for forwarding a packet.

BACKGROUND

Routers and layer-3 switches read a destination internet protocol (IP) address of packets and route the packets according to the IP address. The packet is received on an incoming link of a router, and the router selects an outgoing link or next hop based on the destination IP address. When a packet is transmitted over long distances, multiple routers typically receive and forward the packet, and each router in the path is sometimes referred to as a "hop".

Routers typically employ a forwarding table that includes next hop IP addresses for destination IP addresses in packets. Generally, a forwarding table includes two types of IP addresses: individual host IP addresses and network IP addresses. A host IP address designates one host computer. Host IP addresses are fully specified. An IPv4 host address specifies 32 bits, while an IPv6 host IP address specifies 128 bits.

A network (subnet) IP address aggregates one or more consecutive host IP addresses. Network IP addresses are specified by a prefix. For example, the IPv4 network IP address 0x123456/24 specifies all host IP addresses in the range [0x12345600, 0x123456FF]. When a packet arrives, the router looks up the IP addresses stored in the forwarding table using the packet's destination IP address. The router finds the most specific IP address according to a LPM (Longest Prefix Match) criteria, and forwards the packet to the next hop associated with the most specific IP address.

LPM criteria requires that when a search yields multiple matches (i.e., the searched IP address is contained in several subnets), the packet should be routed to the next hop associated with the network address having the longest prefix. For example, given the IPv4 forwarding table [0x123456/24, 3]; [0x1234567/28, 2]; [0x12345678, 1], a packet with destination IP address 0x12345666 is forwarded to 3 (having only one matching subnet address). A packet with destination address 0x12345677 is forwarded to 2 (having 2 matching subnet addresses and selecting the one with longest matching prefix). A packet with destination address 0x12345678 is forwarded to 1 (having 3 matching subnets and selecting the one with the longest matching prefix).

LPM searches for large forwarding tables can be time and resource intensive. Thus, improving the efficiency of LPM searches is advantageous.

SUMMARY

In an embodiment, a network device forwards packets according to longest prefix matches of network addresses in the packets, and the network device comprises: a memory configured to store a plurality of entries in respective locations in the memory, the plurality of entries corresponding to a trie data structure for performing a longest prefix match search, each of at least some of the stored entries including: longest prefix match information for a node in the trie data structure, and pointer information for one or more other nodes in the trie data structure. The network device also comprises: a forwarding engine configured to forward packets according to longest prefix matches of network addresses in the packets, the forwarding engine comprising: a memory access engine configured to retrieve from a location in the memory, in a single memory lookup operation, i) longest prefix match information for a node corresponding to a network address in a header of a packet, and ii) pointer information that indicates a child node in the trie data structure, wherein the retrieved longest prefix match information includes a plurality of bit tuples that specify one or more address ranges of an address space. The forwarding engine also comprises: a child node address calculator configured to use i) the network address of the packet, ii) the plurality of bit tuples retrieved in the single memory lookup operation, and iii) the pointer information retrieved in the single memory lookup operation, to calculate a memory address of another location in the memory corresponding to the child node in the trie data structure.

In another embodiment, a method is performed in a network device for forwarding packets according to longest prefix matches of network addresses in the packets. The network device comprises a memory configured to store a plurality of entries in respective locations in the memory, the plurality of entries corresponding to a trie data structure for performing a longest prefix match search, each of at least some of the stored entries including: i) longest prefix match information for a node in the trie data structure, and ii) pointer information for one or more other nodes in the trie data structure. The method includes: receiving, at the network device, a network address in a header of a packet; performing a single memory lookup operation to retrieve from a location in the memory, i) longest prefix match information for a node corresponding to the network address, and ii) pointer information that indicates a child node in the trie data structure, wherein the retrieved longest prefix match information includes a plurality of bit tuples that specify one or more address ranges of an address space; and calculating, at the network device, a memory address of another location in the memory corresponding to the child node in the trie data structure, including using i) the network address of the packet, ii) the plurality of bit tuples retrieved in the single memory lookup operation, and iii) the pointer information retrieved in the single memory lookup operation, to calculate the memory address of the other location in the memory corresponding to the child node.

DETAILED DESCRIPTION

Figure 1:
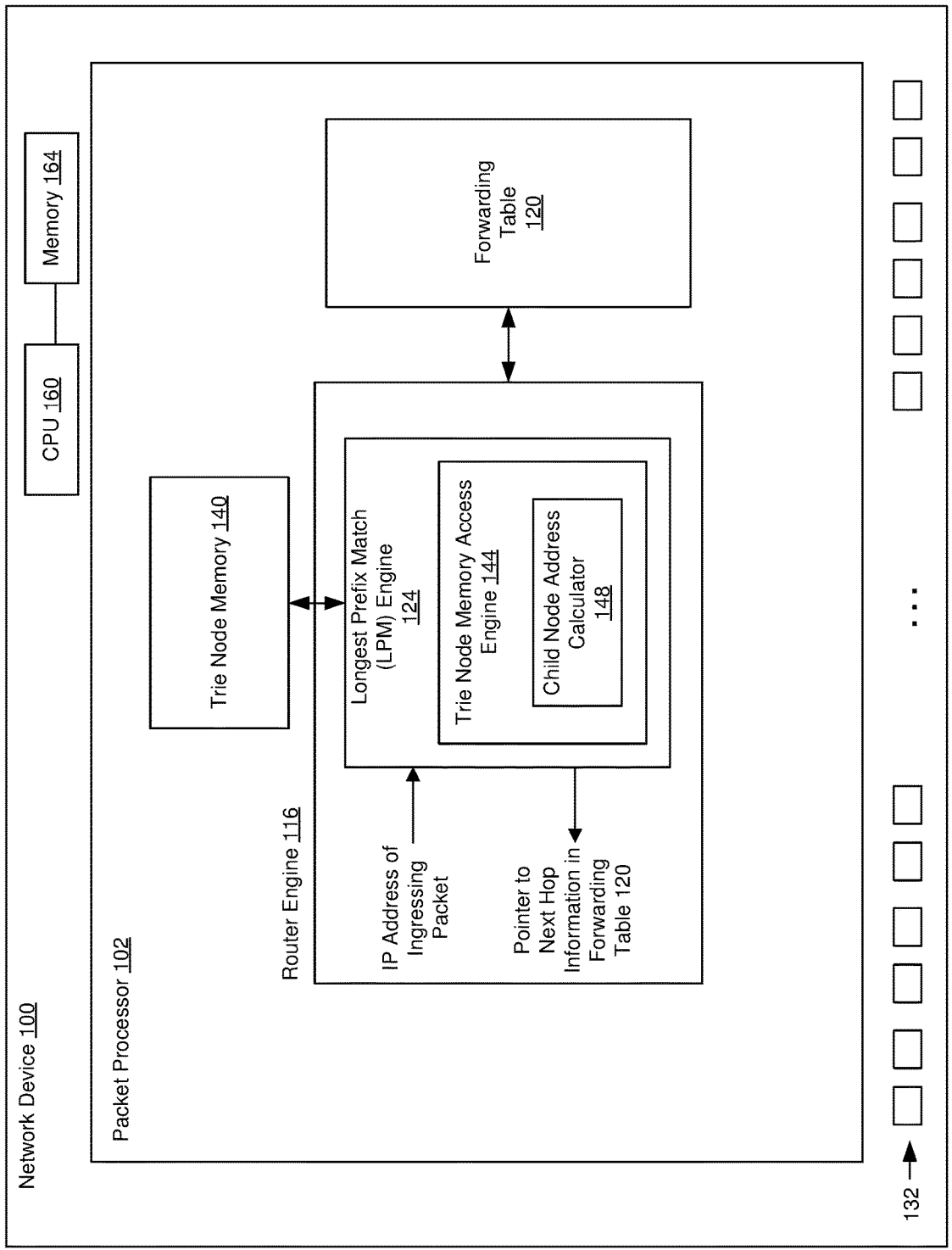
FIG. 1 is a simplified block diagram of an example network device configured to utilize longest prefix (LPM) search techniques of the present disclosure, according to an embodiment.

FIG. 1 is a simplified block diagram of an example network device 100 configured to utilize longest prefix matching techniques of the present disclosure, according to an embodiment. The network device 100 generally forwards packets among two or more computer systems, network segments, subnets, etc. For example, the network device 100 is a router, in one embodiment. It is noted, however, that the network device 100 is not necessarily limited to a particular protocol layer or to a particular networking technology (e.g., Internet Protocol). For instance, in other embodiments, the network device 100 is suitably a bridge, a switch, a virtual private network (VPN) concentrator, etc.

The network device 100 includes a packet processor (or other suitable network processor) 102, and the packet processor 102, in turn, includes a router engine 116 that is configured to make forwarding decisions for packets received by the network device 100 based on network addresses (e.g., Internet Protocol (IP) addresses or other suitable network addresses) in the received packets. The router engine 116 includes or is coupled to a forwarding database (sometimes referred to herein as a "forwarding table") 120 that includes forwarding information used by the router engine 116. The router engine 116 also includes or is coupled to a longest prefix match (LPM) engine 124 that is configured to determine longest prefix matches for network addresses in received packets.

For ease of explanation and to avoid obscuring explanation of the router engine 116 and the LPM engine 124, other processing elements (e.g., a header modification engine, a policing engine, etc.) of packet processor 102 are not shown. The router engine 116 and other processing elements (not shown) are arranged in any suitable parallel or pipelined arrangements, in various embodiments.

For example, in a pipelined packet processing architecture, a plurality of packet processing elements (PPEs) are arranged in a serial, pipeline arrangement, wherein each PPE is configured to perform one or several packet processing operations for a packet and pass the packet (or a packet descriptor corresponding to the packet) to a next PPE for further processing of the packet, according to an embodiment. In an embodiment, the router engine 116 is one of the pipelined PPEs.

As another example, in a parallel processing arrangement, a plurality of PPEs included in the packet processor 102 are configured to perform, in parallel, processing operations on respective packets received by the network device 100, according to an embodiment. The LPM engine 124 is one of a plurality of dedicated processing engines external to the parallel processing PPEs and dedicated to performing certain, for example computationally intensive, processing operations for the packets being processed by the parallel processing PPEs, according to an embodiment. For example, the plurality of parallel processing PPEs comprise processors that are configured to execute computer readable instructions stored in one or more non-transitory memories (not shown), whereas the LPM engine 124 is implemented using hardware circuitry (e.g., on an integrated circuit (IC), an application specific IC (ASIC), etc., in an embodiment.

The network device 100 also includes a plurality of network interfaces (e.g., ports) 132 coupled to the network processor 102, and each of the ports 132 is coupled via a respective communication link to a communication network and/or to another suitable network device within a communication network. Generally speaking, the packet processor 102 is configured to process packets received via ingress ports 132, to determine respective egress ports 132 via which the packets are to be transmitted, and to cause the packets to be transmitted via the determined egress ports 132. In some embodiments, the packet processor 102 processes packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet.

As discussed above, the router engine 116 includes or is coupled to the forwarding table 120, also referred to as the forwarding database 120. In an embodiment, the forwarding database 120 stores network addresses corresponding to next hops to which the packets associated with the network addresses should be transmitted from the network device. In at least some embodiments, the forwarding database 120 stores additional information, such as egress interfaces (e.g., ports 132) of the network device 100 that are to be used to transmit the packets to the next hops.

The router engine 116 is configured to receive a network address, such as an IP address (e.g., a 32-bit IPv4 address or a 128-bit IPv6 address) from a header of the packet, and to perform a lookup in the forwarding database 120, based on the network address, to find, in the forwarding database 120, an entry corresponding to a longest matching prefix of the network address of the packet. According to an embodiment, the router engine 116 retrieves routing information from the longest prefix match entry in the routing table 108 such as a next hop network address and, optionally, an identifier of a network interface (e.g., a port 132) via which the packet is to be transmitted (sometimes referred to herein as an "egress interface"). The packet processor 102 uses the routing information to modify a header of the packet (e.g., to include the next hop network address in the header) and to forward the packet to the egress interface, in an embodiment.

In an embodiment, the forwarding database 120 is stored in a memory external to the routing engine 116. In another embodiment, the forwarding database 120 is stored in a memory internal to the routing engine 116. In an embodiment, the forwarding database 120 is stored in a random access memory, such as a dynamic random access memory (DRAM) or a static random access memory (SRAM), for example. The forwarding database 120 is structured in any suitable manner, and lookups in the forwarding database 120 are performed using any suitable searching techniques (such as using pointers, as will be described in more detail below), in various embodiments.

Figure 2:
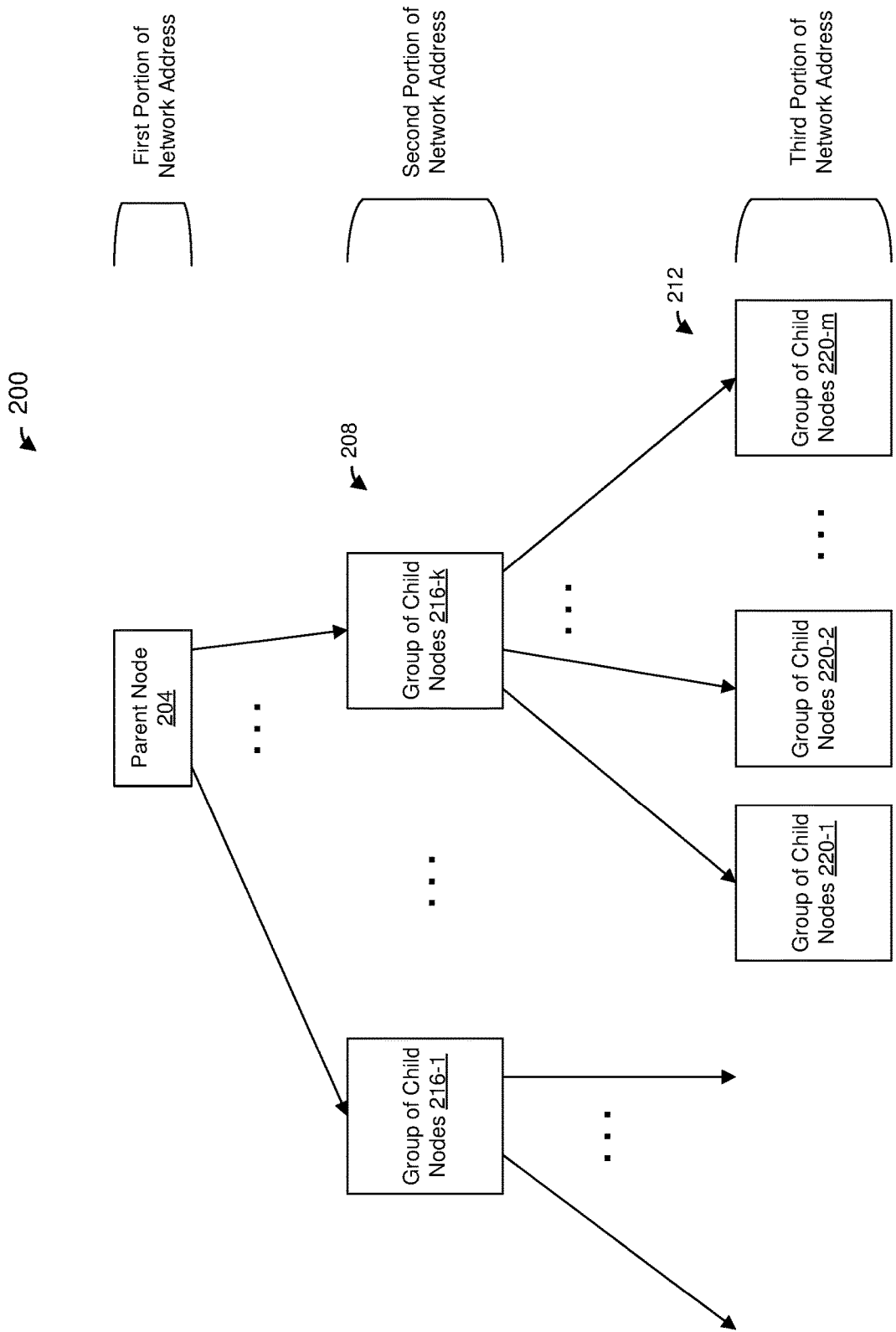
FIG. 2 is a diagram of an example trie node data structure used by the network device of FIG. 1 to perform LPM searches, according to an embodiment.

The LPM engine 124 is coupled to a trie node memory 140. In an embodiment, the trie node memory 140 is configured to store a trie node data structure for performing LPM analyses. FIG. 2 is a diagram of an example trie node data structure 200 that is stored in the trie node memory 140 of FIG. 1, according to an embodiment. The trie node data structure comprises a plurality of nodes that correspond to different portions a network address (e.g., an IP address or another suitable network address). For example, a parent node 204 corresponds to a first portion of a network address (e.g., a first set of most significant bits), a first plurality of child nodes 208 corresponds to a second portion of a network address (e.g., a second set of bits after the first set of bits), a second plurality of child nodes 212 corresponds to a third portion of a network address (e.g., a third set of bits after the second set of bits), etc.

Each node indicates one or more network address prefixes (or one or more portions of network address prefixes) for which forwarding information (e.g., next hop address, egress port(s), etc.) is known by the router engine 116. Additionally, some nodes point to child nodes that correspond to either i) other portions of network address prefixes or ii) pointers to forwarding information in the forwarding database 120.

Nodes that point to other nodes include both i) longest prefix match information corresponding to network addresses, and ii) pointer information that points to one or more child nodes, according to an embodiment. As will be described in more detail below, each of at least some of the nodes is structured so that both i) the longest prefix match information, and ii) the pointer information of a node can be retrieved from the trie node memory 140 in a single memory read operation. As the LPM engine 116 typically needs to perform LPM searches at a fast rate to keep up with packets received by the network device 100, and each LPM search typically requires the LPM engine 124 to access multiple nodes, the ability to access from the trie node memory 140 both i) the longest prefix match information, and ii) the pointer information of a node in a single memory read operation is advantageous.

As will be described in more detail below, the first plurality of child nodes 208 are structured in groups 216 of child nodes, where each of at least some of the groups 216 of child nodes includes multiple child nodes, according to an embodiment. Similarly, the second plurality of child nodes 212 are structured in groups 220 of child nodes, where each of at least some of the groups 220 of child nodes includes multiple child nodes, according to an embodiment. Although FIG. 2 illustrates the trie node 200 having three levels, in other embodiments the trie node 200 includes one or more additional levels of nodes below the nodes 212.

As discussed above, the child nodes 208 are organized as groups of nodes 216, and the parent node 204 includes information that points to individual nodes within groups of nodes 216. Similarly, the nodes 212 are organized as groups of nodes 220, and different nodes 208 include information that point to individual nodes within the groups of nodes 220.

Referring again to FIG. 1, the LPM engine 124 includes a trie node memory access engine 144 that is configured to retrieve information from nodes stored in the trie node memory 140. For example, when the trie node memory access engine 144 accesses a node point that points to one or more child nodes, the LPM engine 124 is configured to retrieve from the trie node memory 140, in a single memory read operation, both i) longest prefix match information in the node, and ii) pointer information that points to one or more child nodes, according to an embodiment.

The LPM engine 124 also includes a child node address calculator 148. The child node address calculator 148 is configured to calculate an address of a child node by using information retrieved by the LPM engine 124 from another node in the trie node memory 140 in a single memory read operation. For example, the child node address calculator 148 is configured to use i) longest prefix match information in a node, and ii) pointer information in the node that points to one or more child nodes, which was retrieved by the LPM engine 124 from the node in the trie node memory 140 in a single memory read operation, according to an embodiment. Operation of the child node address calculator 148 will be described in more detail below.

Referring now to FIGS. 1 and 2, the LPM engine 124 uses successive sets of bits in a network address of a packet to determine a path from the parent node 204 to lower search levels in the trie node data structure 200. The LPM engine 124 terminates a search when a pointer to a next hop is encountered in a child node. In an embodiment, search time, as well as the depth of the trie node data structure 200, is proportional to a length of the network address to be searched, according to an embodiment.

When the LPM engine 124 performs an LPM search for a packet, the LPM engine 124 retrieves, in a single memory read operation, i) longest prefix match information in the parent node 204, and ii) pointer information in the parent node 204 (e.g., pointing to a child node 208 or group of child nodes 216, in various embodiments). The LPM engine 124 uses the longest prefix match information retrieved from the parent node 204 to determine a longest prefix match for a first portion of a network address in the packet. Additionally, the LPM engine 124 uses (e.g., the child node address calculator 148 uses) the pointer information retrieved from the parent node 204 to calculate an address to a child node within one of the groups of child nodes 216.

If the child node within the group of child nodes 208 points to a next hop address, the LPM engine 124 retrieves from the child node 208, in a single memory read operation, a pointer to a forwarding information in the forwarding table 120, and the LPM search ends. A child node that points to a next hop address is sometimes referred to herein as a "leaf node".

On the other hand, if the child node within the group of child nodes 208 is not a leaf node, the LPM engine 124 retrieves, in a single memory read operation, i) longest prefix match information in the child node 208, and ii) pointer information in the child node 208. The LPM engine 124 uses the longest prefix match information retrieved from the child node 208 to determine a longest prefix match for a second portion of a network address in the packet. Additionally, the LPM engine 124 uses (e.g., the child node address calculator 148 uses) the pointer information retrieved from the child node 208 to calculate an address to a child node 212 within one of the groups of child nodes 220.

If the child node 212 is a leaf node, the LPM engine 124 retrieves from the child node 212, in a single memory read operation, a pointer to an entry in the forwarding table 120, and the LPM search ends.

On the other hand, if the child node 212 is not a leaf node and the trie node data structure 200 includes one or more additional levels, the LPM search continues in a similar manner with child nodes in the one or more additional levels until a leaf node is found.

Although FIG. 2 illustrates the second level of the trie node data structure 200 including multiple groups of child nodes 216, in other embodiments the second level of the trie node data structure 200 consists of a single group of child 216.

In an embodiment, the trie node memory 140 is stored in a memory external to the LPM engine 124. In another embodiment, the trie node memory 140 is stored in a memory internal to the LPM engine 124. In an embodiment, the trie node memory 140 is stored in a random access memory, such as a DRAM or an SRAM, for example. In an embodiment, the forwarding database 120 and the trie node memory 140 are implemented using a single memory device. In another embodiment, the forwarding database 120 and the trie node memory 140 are implemented using different memory devices. In an embodiment, the trie node memory 140 is implemented using a plurality of memory banks.

Figure 3:
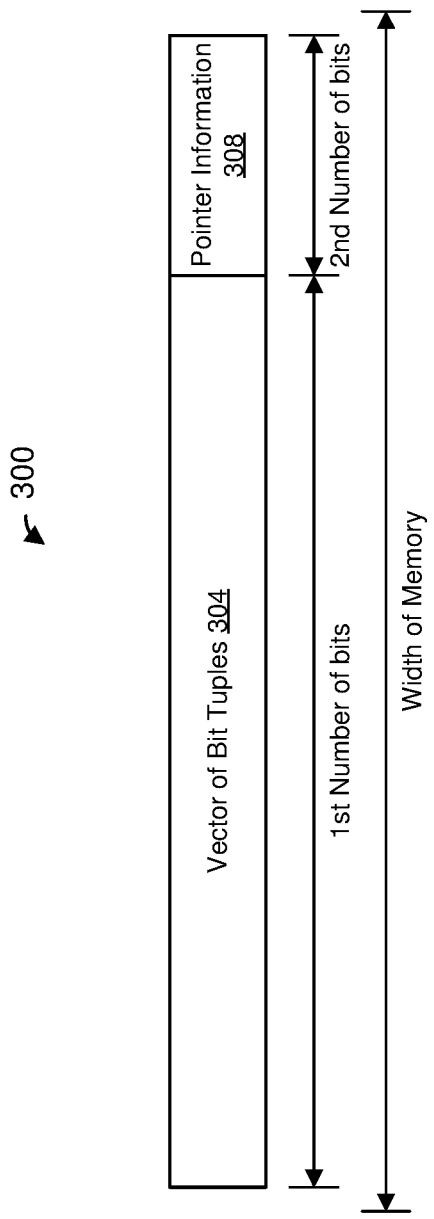
FIG. 3 is a block diagram of an example information in a trie node of the trie node data structure of FIG. 2, according to an embodiment.

FIG. 3 is a simplified diagram of a portion of an example node 300 in a trie data structure, such as the trie data structure 200 of FIG. 2, according to an embodiment. The portion of the node 300 includes a vector of bit tuples 304 and pointer information 308. The vector of bit tuples 304 consists of a first number of bits and the pointer information 308 consists of a second number of bits. A number of bits in the portion of the node is less than or equal to a width of a memory device that stores the portion of the node 300, and therefore the stored portion of the node 300 can be retrieved from the memory device in a single read operation.

The vector of bit tuples 304 includes LPM information, and the pointer information 308 includes information for determining a pointer to a child node. The LPM information 304 will be explained in more detail with reference to FIGS. 4-6. In an embodiment, the pointer information 308 includes a base pointer to a group of child nodes (e.g., in FIG. 2, group 208, groups 220, etc.), and the LPM information 304 is used to select a particular child node within the group of child nodes indicated by the base pointer.

Figure 4:
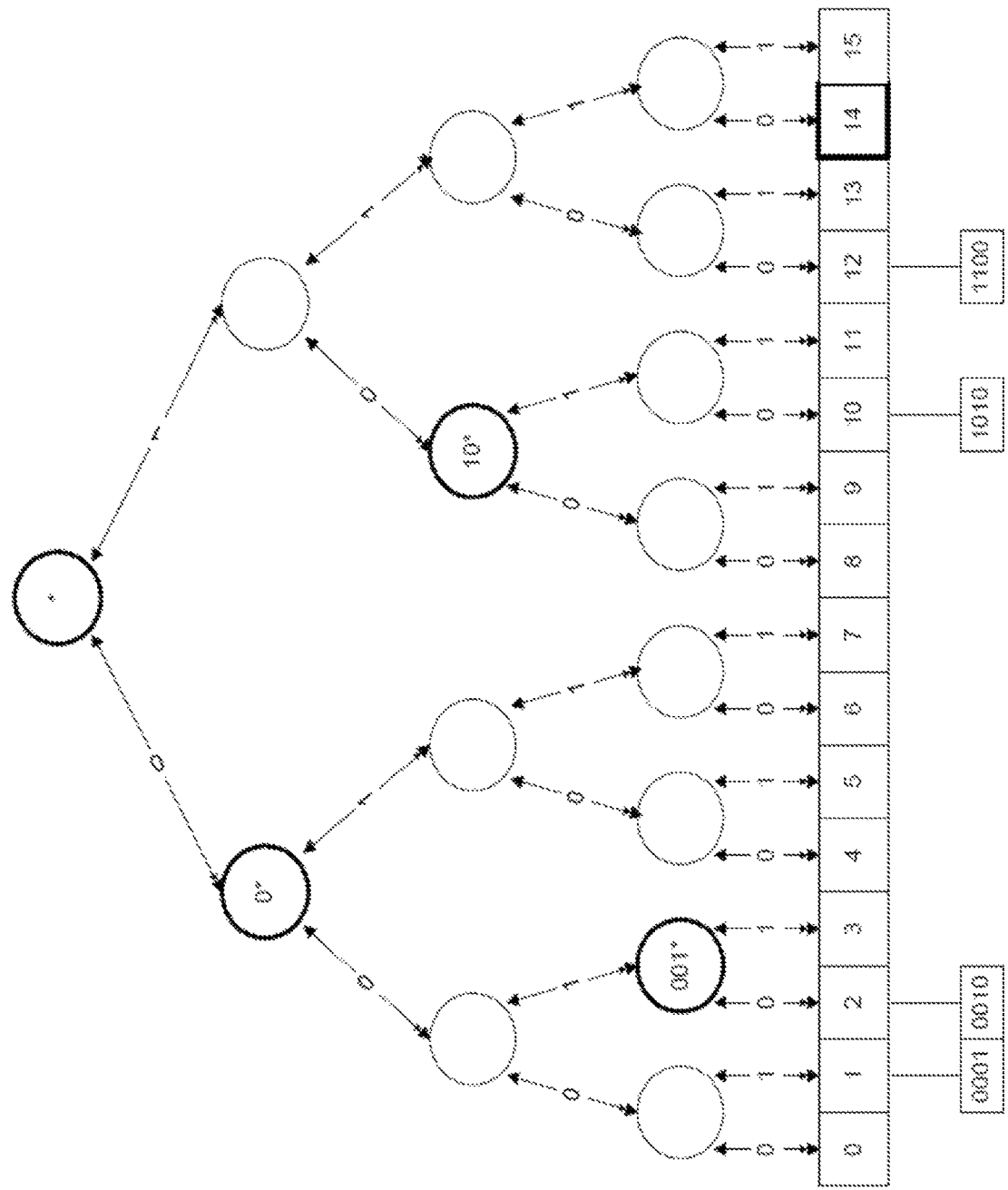
FIG. 4 is a diagram of an example network address space addressed by four bits and which includes 16 different addresses 0000-1111, according to an embodiment.
Figure 5:
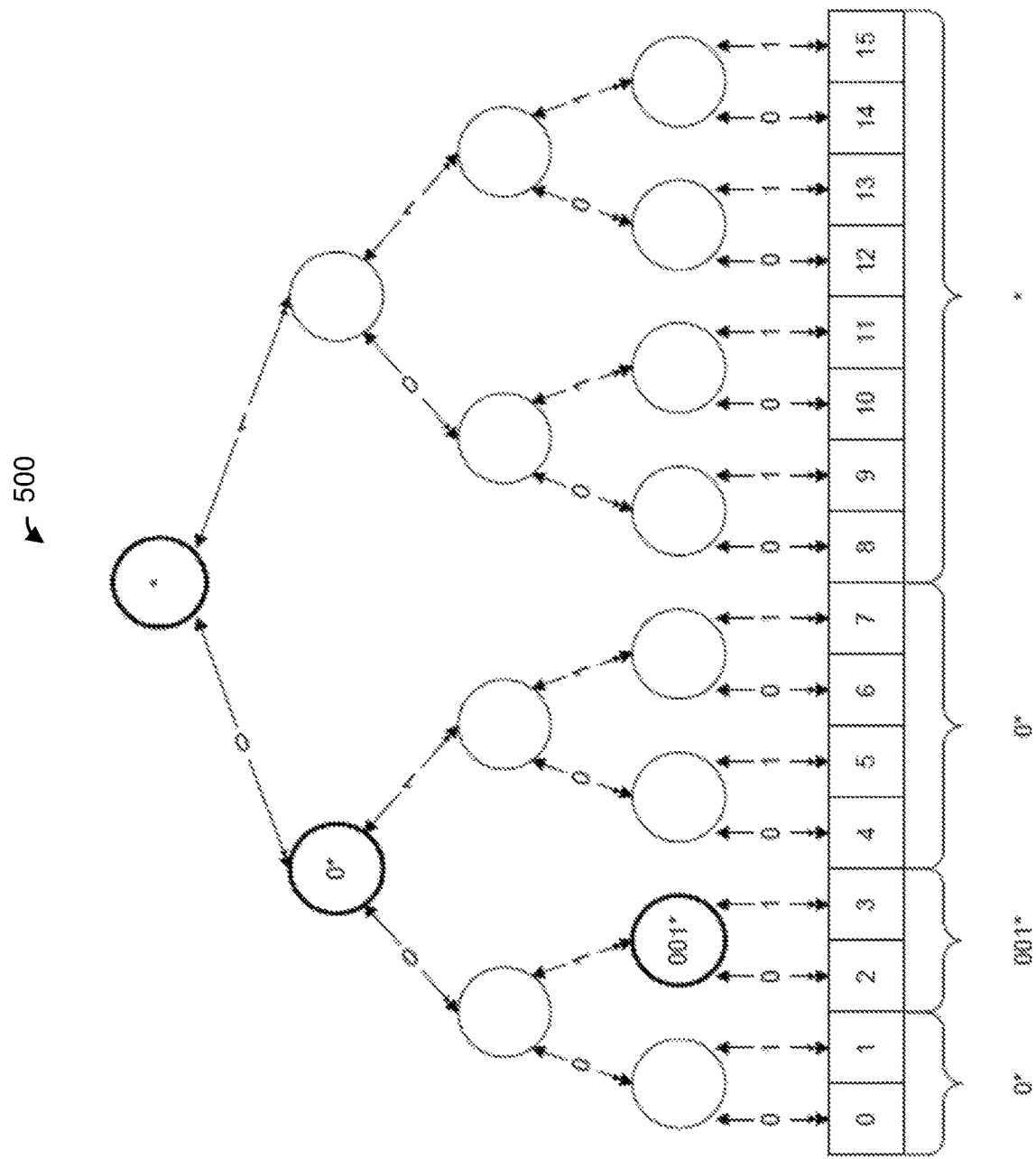
FIG. 5 is a diagram of the example network address space of FIG. 4 split into different ranges corresponding to different prefixes, according to an embodiment.

FIG. 4 is a diagram of an example network address space addressed by four bits and which includes 16 different addresses 0000-1111 indicated by the bottom row of boxes numbers 0-15. FIG. 5 is a diagram of the example network address space of FIG. 4 split into different ranges corresponding to different prefixes. For example, a prefix 0* corresponds to an address range 0000-0111. On the other hand, a prefix 001* covers an address range 0010-0011. The term "covering" means that a search for a network address of a packet in the range 0010-0011 should be matched to the forwarding information corresponding to prefix 001*. Range 1000-1111 corresponds to a default route (prefix *).

In the example of FIG. 5, the prefix 001* covers a subset of addresses within a range (e.g., 0000-0111) that corresponds to the prefix 0*. Thus, although the address 0011 is a match with both prefix 0* and prefix 001*, prefix 001* is the longest prefix match. Thus, the prefix 0* is illustrated in FIG. 5 as "covering" two ranges: 0000-0001 and 0100-0111, i.e., the prefix 0* generally covers the range 0000-0111, except for the subrange 0010-0011, which is covered by the longer prefix 001*.

U.S. Pat. No. 7,212,531, which is hereby incorporated by reference, further describes address ranges, address prefixes, and the covering of address ranges by prefixes.

Figure 6:
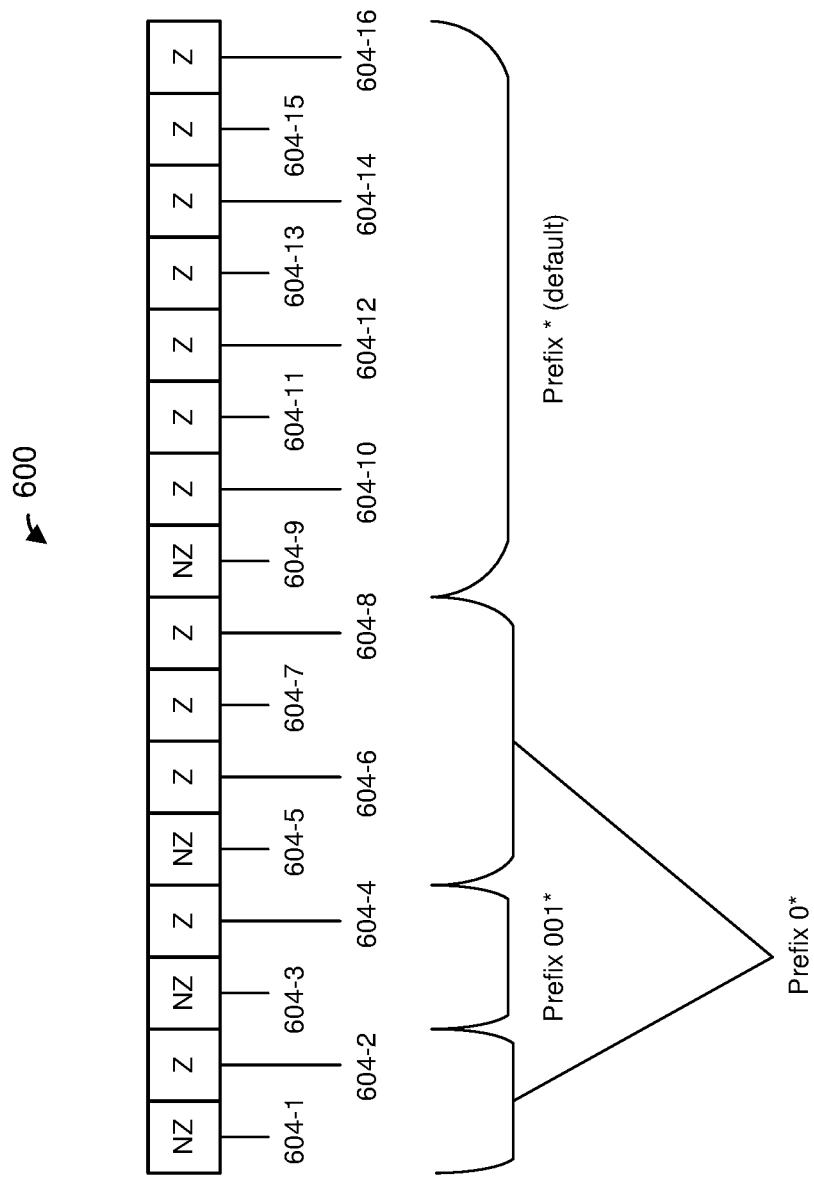
FIG. 6 is a diagram of an example vector of bit tuples corresponding to the network address space of FIGS. 4 and 5, and which may be included in a trie node of the trie node data structure of FIG. 2, according to an embodiment.

FIG. 6 is a diagram of an example vector of bit tuples 600 corresponding to the network address space of FIGS. 4 and 5, according to an embodiment. In an embodiment, the vector of bit tuples 600 is included in the portion of the node 300 of FIG. 3.

The vector of bit tuples 600 includes a plurality of bit tuples 604 corresponding to respective addresses in the address space of FIGS. 4 and 5. Bit tuples 604 are set with zero values (Z) or non-zero values (NZ) to indicate particular addresses and/or address ranges corresponding to prefix matches. For example, the tuple 604-1 is set to NZ and the tuple 604-2 is set to Z to indicate a match with the range 0000-0001. The tuple 604-3 is set to NZ and the tuple 604-4 is set to Z to indicate a match with the range 0010-0011. The tuple 604-5 is set to NZ and the tuples 604-6 to 604-8 are set to Z to indicate a match with the range 0100-0111. The tuple 604-9 is set to NZ and the tuples 604-10 to 604-16 are set to Z to indicate a match with the range 1000-1111.

Each NZ tuple corresponds to a child node, according to an embodiment. In an embodiment, each child node is of a plurality of different types of nodes, and the NZ value of the tuple indicates the type of child node. For example, the plurality of different types of nodes consists of three types: a regular type, a compressed type, and a leaf type; and each tuple consists of two bits, according to an embodiment. According to an embodiment, a regular type node corresponds to a node that is used to specify one or more address ranges; a compressed type node corresponds to a node that is used to specify a limited number of address ranges and/or which points to a limited number of child nodes; and a leaf type node includes a pointer to an entry in the forwarding database 120. In an embodiment, a leaf type node does not point to any other node in the trie node data structure. In another embodiment, a leaf type node is permitted to point to another leaf node in the trie node data structure.

As an illustrative example of tuple values that indicate different types of child nodes, a tuple value of 01 indicates a leaf node, a tuple value of 10 indicates a regular node, and a tuple value of 11 indicates a compressed node, according to an embodiment. As another illustrative example of tuple values that indicate different types of child nodes, a tuple value of 01 indicates a regular node, a tuple value of 10 indicates a compressed node, and a tuple value of 11 indicates a leaf node, according to another embodiment. As another illustrative example of tuple values that indicate different types of child nodes, a tuple value of 01 indicates a compressed node, a tuple value of 10 indicates a leaf node, and a tuple value of 11 indicates a regular node, according to another embodiment. Values other than these specific examples set forth above are used in other embodiments. Regular type, compressed type, and leaf type nodes are described in more detail below.

In various other embodiments, a number of types of nodes other than three are utilized and/or each tuple consists of a number of bits equal to three or more. For instance, in another embodiment, the plurality of different types of nodes consists of two types: a regular type, and a leaf type; and each tuple consists of two bits. In other embodiments, the plurality of different types of nodes consists of four, five, six, etc., types, and each tuple consists of three, four, etc., bits, according to various other embodiments.

Referring now to FIGS. 1 and 6, when the LPM engine 124 retrieves LPM information (including a vector of bit tuples such as the vector 600 of FIG. 6), the LPM engine determines a tuple in the vector 600 that corresponds to a portion of a network address of a packet. As an illustrative example, the LPM engine 124 determines a tuple in the vector 600 that corresponds to the four most significant bits of the network address of the packet. For instance, if the four most significant bits of the network address of the packet equal 0111, the LPM engine 124 identifies the tuple 604-7 as corresponding to the four most significant bits of the network address of the packet. According to an embodiment, the LPM engine 124 determines (e.g., the child node address calculator 148 determines) a pointer to a child node using i) the determined tuple 604 that corresponds to the portion of the network address of the packet, ii) non-zero information in one or more tuples 604 in the vector 600, and iii) pointer information (e.g., such as pointer information 308 of FIG. 3) retrieved from the node in the trie data structure, as will be described in more detail later.

Although FIGS. 4-6 were described in the context of four bits of a network address, each node in a trie node data structure typically corresponds to a larger number of bits of a network address, which corresponds to a vector of tuples that include numbers of tuples greater than 16. Thus, in other embodiments, to allow for longer tuple vectors that correspond to a larger number of bits from a network address of a packet, a node is structured so that the tuple vector is stored across multiple consecutive entries (e.g., lines) in a memory.

Figure 7:
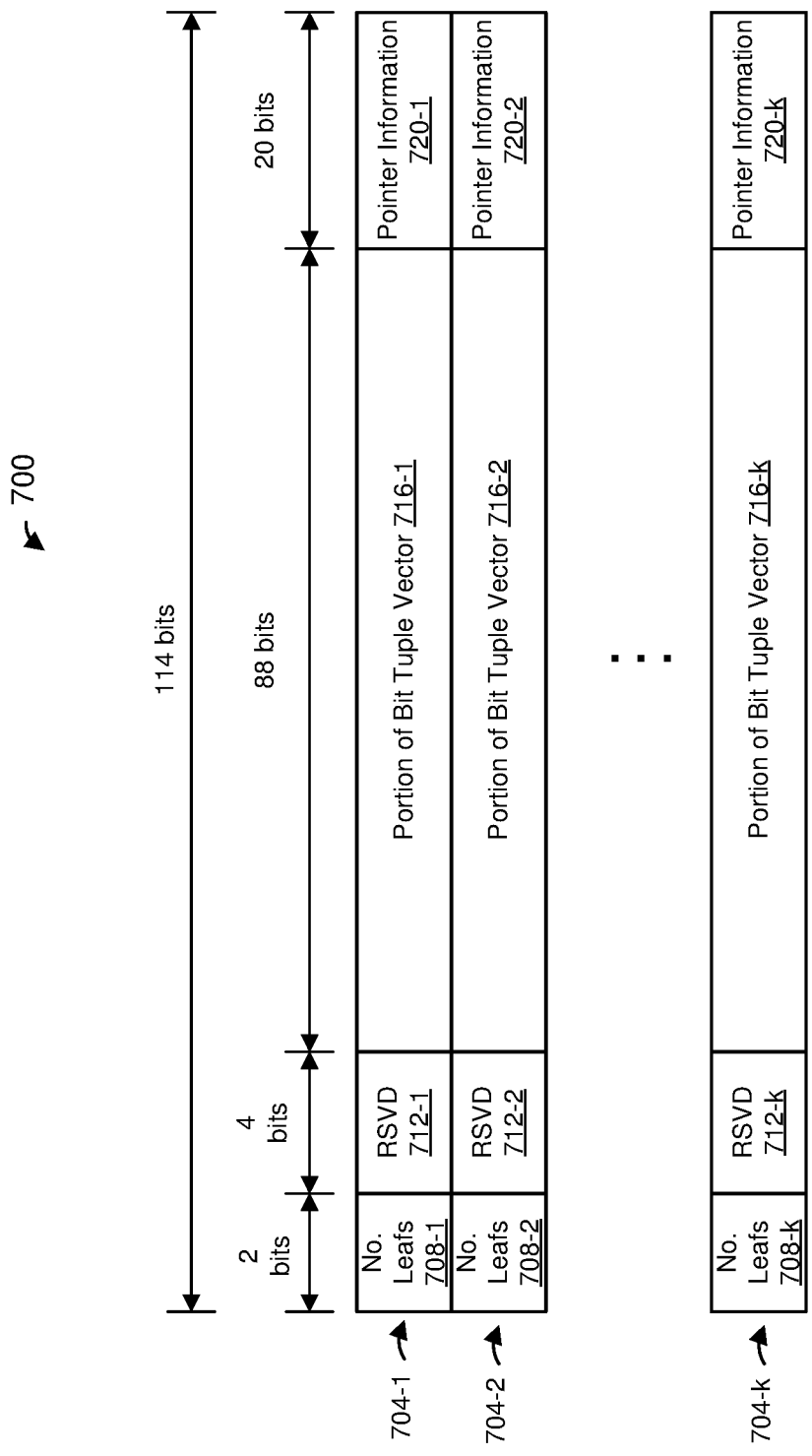
FIG. 7 is a diagram of an example trie node stored across multiple memory locations, according to an embodiment.

FIG. 7 is a diagram of an example regular node 700, according to an embodiment. Although FIG. 7 shows example numbers of bits for various fields of the regular node 700, other suitable numbers of bits are used in other embodiments. In some embodiments, one or more of the fields illustrated in FIG. 7 are omitted, and/or other fields (not shown) are included. In other embodiments, an ordering of fields is used that is different than the ordering illustrated in FIG. 7.

The regular node 700 includes a plurality of portions 704, where each portion 704 is stored in a respective entry (e.g., line) of the trie node memory 140, and the portions 704 are stored in consecutive entries (e.g., lines) of the trie node memory 140, according to an embodiment. In an embodiment, each portion 704 comprises a number of bits that is less than or equal to a width of an entry (e.g., line) of the trie node memory 140.

Each portion 704 includes a number of leafs field 708, which is set to a default value (e.g., zero or another suitable default value) for regular nodes, according to an embodiment. Each portion 704 also includes a reserved field 712. In some embodiments, the number of leafs field 708 and/or the reserved field 712 is omitted.

Each portion 704 also includes a respective field 716 that includes a portion of a tuple vector. In an embodiment, the regular node 700 corresponds to an eight bit portion of a network address; thus the tuple vector includes 256 tuples; each tuple consists of two bits, and the regular node consists of six portions 704 stored across six consecutive entries (e.g., lines) of the trie node memory 140. In various other embodiments, the tuple vector corresponds to a portion of a network address that consists of a suitable number of bits other than eight, and/or the width of the portions 704 is different than illustrated in FIG. 7; and the regular node 700 consists of a suitable number of portions 704 other than six.

Each portion 704 also includes a respective field 720 that includes pointer information for determining a location(s) of a child node(s). In an embodiment, the pointer information in field 720 includes a base pointer to a group of child nodes (e.g., in FIG. 2, group 208, groups 220, etc.).

Referring now to FIGS. 1 and 7, when the LPM engine 124 receives a network address of a packet in connection with an LPM search, the LPM engine 124 uses a portion of the network address to determine a tuple in a tuple vector that spans the fields 716 in the portions 704. For example, the LPM engine 124 uses the portion of the network address to determine one of the portions 704, and then retrieves the portion 704. The LPM engine 124 then determines a tuple in the field 716 that corresponds to the portion of a network address of a packet. According to an embodiment, the LPM engine 124 determines (e.g., the child node address calculator 148 determines) a pointer to a child node using i) the determined tuple in the field 716 that corresponds to the portion of the network address of the packet, ii) non-zero information in the field 716, and iii) pointer information 720, as will be described in more detail later. For example, in an embodiment in which the field 720 includes a base pointer to a group of child nodes, the base pointer in the field 720 points to a group of child nodes (e.g., in FIG. 2, group 208, groups 220, etc.), and the LPM engine 124 uses i) the determined tuple in the field 716 that corresponds to the portion of the network address of the packet, and ii) non-zero information in the field 716, to select a particular child node within the group of child nodes indicated by the base pointer of the field 720, as will be described in more detail below.

Figure 8:
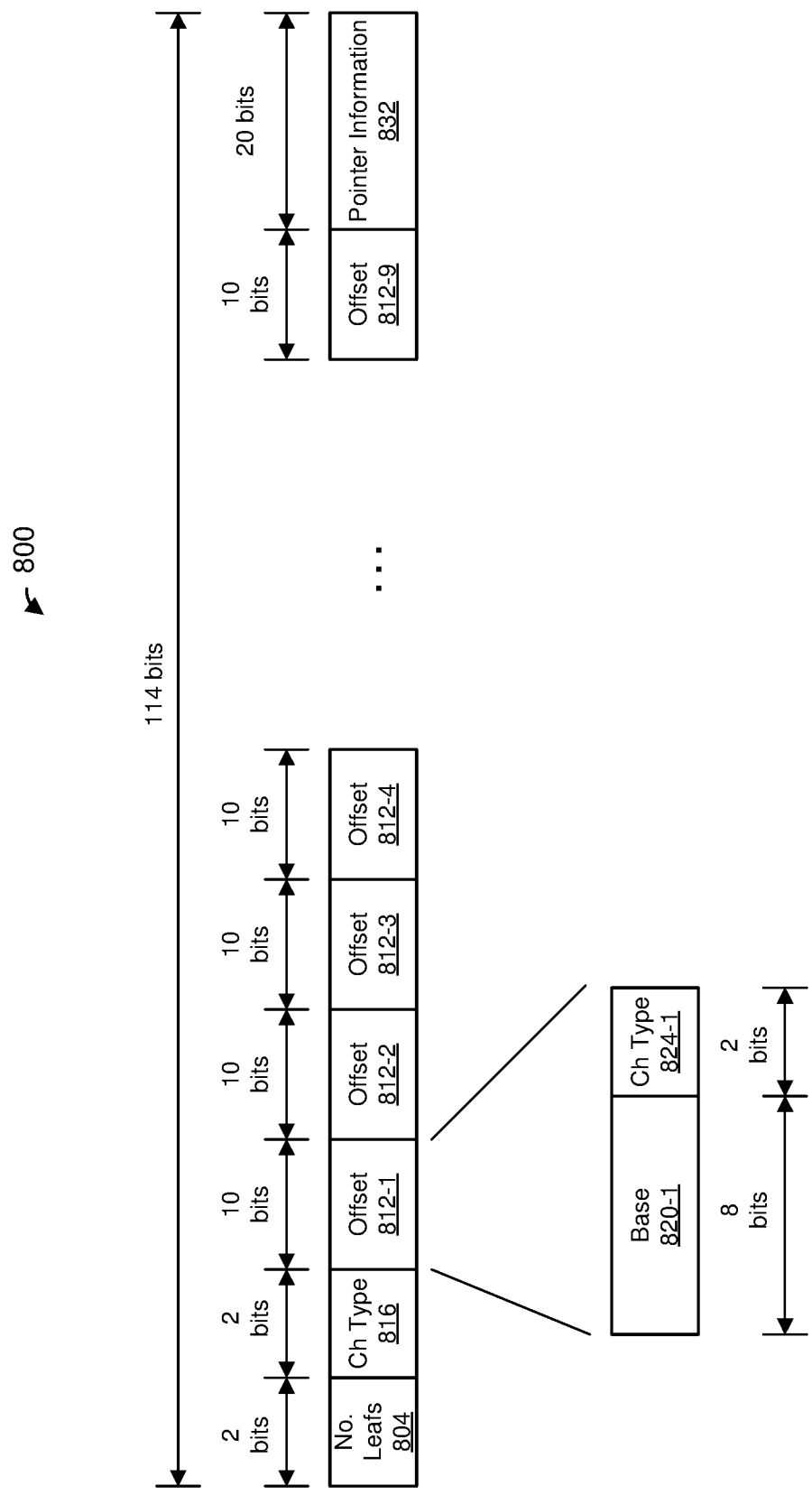
FIG. 8 is a diagram of an example compressed trie node stored within a single memory location, according to an embodiment.

FIG. 8 is a diagram of an example compressed node 800, according to an embodiment. Although FIG. 8 shows example numbers of bits for various fields of the compressed node 800, other suitable numbers of bits are used in other embodiments. In some embodiments, one or more of the fields illustrated in FIG. 8 are omitted, and/or other fields (not shown) are included. In other embodiments, an ordering of fields is used that is different than the ordering illustrated in FIG. 8.

The compressed node 800 is used for a trie node when the trie node has a number of child nodes that is less than or equal to a threshold. As an illustrative embodiment, compressed node 800 is used when the trie node has ten or less children, according to an embodiment. In other embodiments, the threshold is a suitable number different than ten.

The compressed node 800 includes a number of leafs field 804, which is set to a default value (e.g., zero or another suitable default value) for compressed nodes with the format illustrated in FIG. 8, according to an embodiment.

The compressed node 800 also includes a plurality of offset fields 812 for specifying up to the threshold number of child nodes (e.g., ten or another suitable number of child nodes). In an embodiment, each offset field 812 indicates a respective base value of a range, and the base values in the offset fields 812 are in ascending order (e.g., from left to right in FIG. 8). A first range (Range_1) is defined from zero up to a base value (Base_1) specified in the offset field 812-1 (e.g., 0≤Range_1<Base_1). The compressed node 800 also includes a child type field 816 for specifying a child type for the first range (Range_1). The child type field 816 is set in a manner similar to the bit tuples described with reference to FIGS. 6 and 7. For example, a non-zero value in the child type field 816 indicates Range_1 corresponds to a child node, according to an embodiment. In an embodiment, each child node is of a plurality of different types of nodes, and the NZ value in the field 816 indicates the type of child node (e.g., regular, compressed, or leaf).

Each offset field 812 comprises a respective base subfield 820 and a respective child type subfield 824, according to an embodiment. The child type subfield 824 is set in a manner similar to the bit tuples described with reference to FIGS. 6 and 7. For example, a zero value in the child type subfield 824 indicates that the offset field 812 is not associated with a child node; whereas a non-zero value in the child type subfield 824 indicates the offset field 812 corresponds to a child node, according to an embodiment. When the child type subfield 824 is NZ (e.g., the offset field 812 corresponds to a child node), the base subfield 820 indicates a base address of a range corresponding to the child node.

A second range (Range_2) is defined from the base value (Base_1) specified in the offset field 812-1 up to a base value in a next offset field 812 with a NZ child type subfield 824. Offset field 812-9 is used for a range that ends in a highest possible value of a portion of a network address (as an illustrative example, for an eight bit portion of an address, 255). As an illustrative example for an eight bit portion of an address, to specify ranges 0-100, 101-200, and 201-255, fields of the compressed node 800 are set as follows: child type field 816 is set to NZ, base subfields 820-1 through 820-8 are set to 101, child type subfields 824-1 through 824-8 are set to Z, base subfield 820-9 is set to 201, and child type subfield 824-9 is set to NZ, according to an embodiment. As another illustrative example for an eight bit portion of an address, to specify ranges 0, 1, 2, 3, 4, 5, 6, 7, 8-254, and 255, fields of the compressed node 800 are set as follows: child type field 816 is set to NZ, base subfield 820-1 is set to 1, base subfield 820-2 is set to 2, base subfield 820-3 is set to 3, base subfield 820-4 is set to 4, base subfield 820-5 is set to 5, base subfield 820-6 is set to 6, base subfield 820-7 is set to 7, base subfield 820-8 is set to 8, base subfield 820-9 is set to 255, and child type subfields 824-1 through 824-9 are set to NZ values, according to an embodiment.

The compressed node 800 also includes a field 832 that includes pointer information for determining a location(s) of a child node(s). In an embodiment, the pointer information in field 832 includes a base pointer to a group of child nodes (e.g., in FIG. 2, group 208, groups 220, etc.).

Referring now to FIGS. 1 and 8, when the LPM engine 124 reaches, during an LPM search, a compressed child node such as the compressed node 800, the LPM engine 124 retrieves the compressed node. The LPM engine 124 then determines an offset field 812 in the field 716 that corresponds to the portion of a network address of a packet. According to an embodiment, the LPM engine 124 determines (e.g., the child node address calculator 148 determines) a pointer to a child node using i) the determined offset field 812 that corresponds to the portion of the network address of the packet, ii) non-zero information in the offset fields 812, and iii) pointer information 832, as will be described in more detail later. For example, in an embodiment in which the field 832 includes a base pointer to a group of child nodes, the base pointer in the field 832 points to a group of child nodes (e.g., in FIG. 2, group 208, groups 220, etc.), and the LPM engine 124 uses i) the determined offset field 812 that corresponds to the portion of the network address of the packet, and ii) non-zero information in the fields 812, to select a particular child node within the group of child nodes indicated by the base pointer of the field 832, as will be described in more detail below.

Figure 9A:
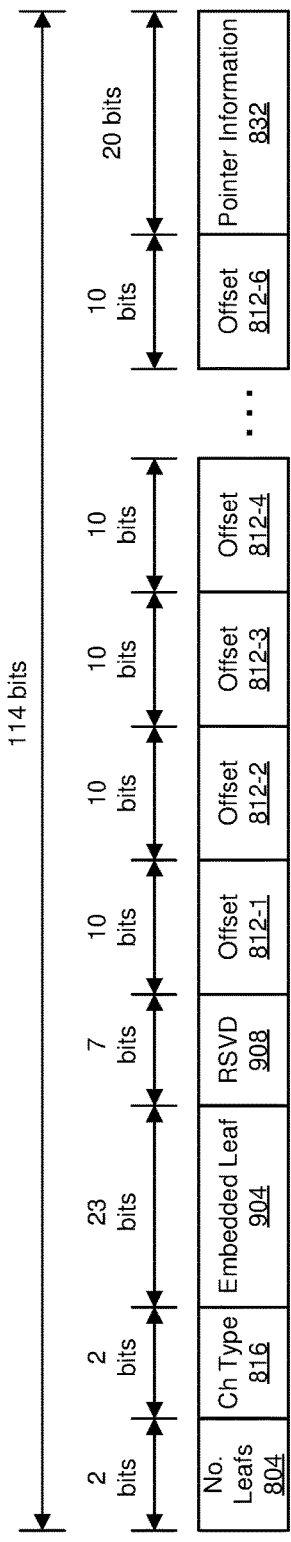
FIGS. 9A-C are diagrams of example compressed trie nodes that included one or more embedded leaf trie nodes, according to an embodiment.
Figure 9B:
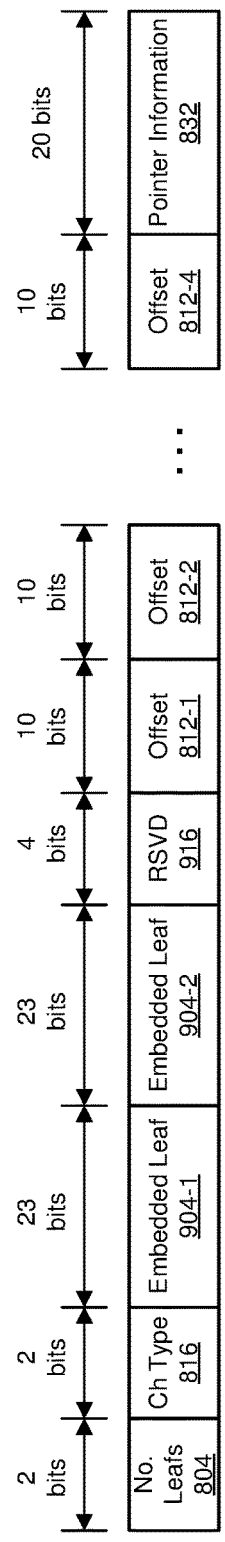
Figure 9C:
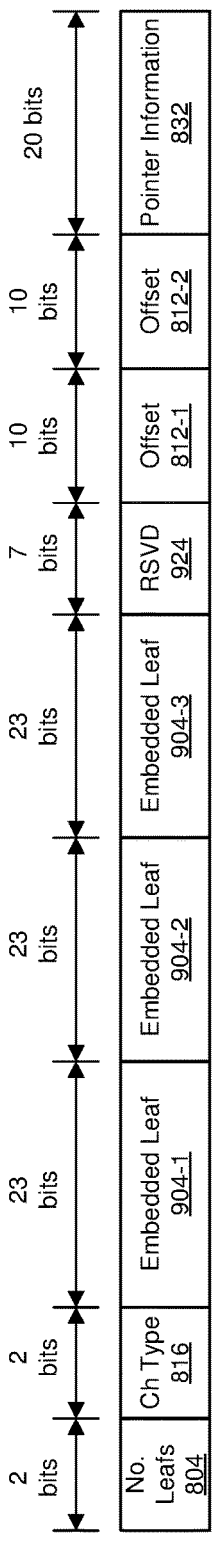

FIGS. 9A-C are diagrams of other example compressed nodes in which one or more leaf nodes are embedded in the compressed node, according to various embodiments. Although FIGS. 9A-C show example numbers of bits for various fields of the compressed nodes, other suitable numbers of bits are used in other embodiments. In some embodiments, one or more of the fields illustrated in FIGS. 9A-C are omitted, and/or other fields (not shown) are included. In other embodiments, an ordering of fields is used that is different than the orderings illustrated in FIGS. 9A-C.

Referring to FIG. 9A, a compressed node 900 is used for a trie node when the trie node has a number of child nodes that is less than or equal to a threshold. As an illustrative embodiment, compressed node 900 is used when the trie node has seven or less children, according to an embodiment. In other embodiments, the threshold is a suitable number different than seven.

The compressed node 900 is similar to the compressed node 800 of FIG. 8, and elements that have the same reference numeral as corresponding elements in FIG. 8 are not discussed in detail for purposes of brevity.

With the compressed node 900, the number of leafs field 804 is set to one to indicate that the compressed node 900 includes one embedded leaf node and has the format illustrated in FIG. 9A, according to an embodiment.

The compressed node 900 includes an embedded leaf node 904. The embedded leaf node 904 includes a pointer to forwarding information in the forwarding database 120 (FIG. 1), according to an embodiment.

The compressed node 900 includes fewer offset fields 812 than the compressed node 800 of FIG. 8. Additionally, the compressed node 900 includes a reserved field 908.

Referring to FIG. 9B, a compressed node 912 is used for a trie node when the trie node has a number of child nodes that is less than or equal to a threshold. As an illustrative embodiment, compressed node 912 is used when the trie node has five or less children, according to an embodiment. In other embodiments, the threshold is a suitable number different than five.

The compressed node 912 is similar to the compressed node 800 of FIG. 8 and the compressed node 900 of FIG. 9A, and elements that have the same reference numeral as corresponding elements in FIG. 8 are not discussed in detail for purposes of brevity.

With the compressed node 912, the number of leafs field 804 is set to two to indicate that the compressed node 912 includes two embedded leaf nodes and has the format illustrated in FIG. 9B, according to an embodiment.

The compressed node 912 includes two embedded leaf nodes 904. Each embedded leaf node 904 includes a respective pointer to forwarding information in the forwarding database 120 (FIG. 1), according to an embodiment.

The compressed node 912 includes fewer offset fields 812 than the compressed node 900 of FIG. 9A. Additionally, the compressed node 912 includes a reserved field 916.

Referring to FIG. 9C, a compressed node 920 is used for a trie node when the trie node has a number of child nodes that is less than or equal to a threshold. As an illustrative embodiment, compressed node 920 is used when the trie node has three or less children, according to an embodiment. In other embodiments, the threshold is a suitable number different than three.

The compressed node 920 is similar to the compressed node 800 of FIG. 8, the compressed node 900 of FIG. 9A, and the compressed node 912 of FIG. 9B, and elements that have the same reference numeral as corresponding elements in FIG. 9A are not discussed in detail for purposes of brevity.

With the compressed node 920, the number of leafs field 804 is set to three to indicate that the compressed node 920 includes three embedded leaf nodes and has the format illustrated in FIG. 9C, according to an embodiment.

The compressed node 920 includes three embedded leaf nodes 904. Each embedded leaf node 904 includes a respective pointer to forwarding information in the forwarding database 120 (FIG. 1), according to an embodiment.

The compressed node 920 includes fewer offset fields 812 than the compressed node 912 of FIG. 9B. Additionally, the compressed node 920 includes a reserved field 924.

Figure 10:
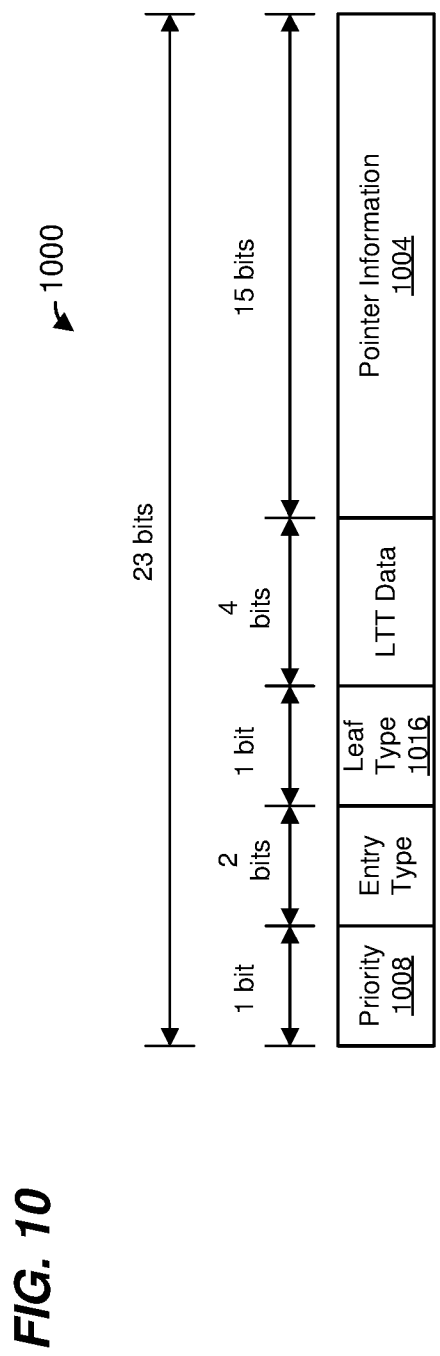
FIG. 10 is a diagram of an example leaf trie node, according to an embodiment.

FIG. 10 is a diagram of an example leaf node 1000, according to an embodiment. Although FIG. 10 shows example numbers of bits for various fields of the leaf node 1000, other suitable numbers of bits are used in other embodiments. In some embodiments, one or more of the fields illustrated in FIG. 10 are omitted, and/or other fields (not shown) are included. In other embodiments, an ordering of fields is used that is different than the ordering illustrated in FIG. 10.

In an embodiment, multiple leaf nodes are stored in a single entry (e.g., a line) of a memory.

The leaf node 1000 is used for a trie node that corresponds to an end of an LPM search.

The leaf node 1000 includes pointer information 1004 to forwarding information in the forwarding database 120 (FIG. 1), and the router engine uses the pointer information 1004 to retrieve forwarding information (e.g., a next hop address, egress port information, etc.) from the forwarding database 120 for a packet, according to an embodiment.

In some embodiments, the leaf node 1000 includes one or more additional fields. For example, the leaf node 1000 includes a priority field 1008 that indicates whether an exact match of a network address has priority over an LPM result, or vice versa, according to an embodiment. As another example, the leaf node 1000 includes a leaf type field 1016 that indicates whether the leaf node 1000 corresponds to a multipath forwarding result or a non-multipath path forwarding result, according to an embodiment.

Figure 11:
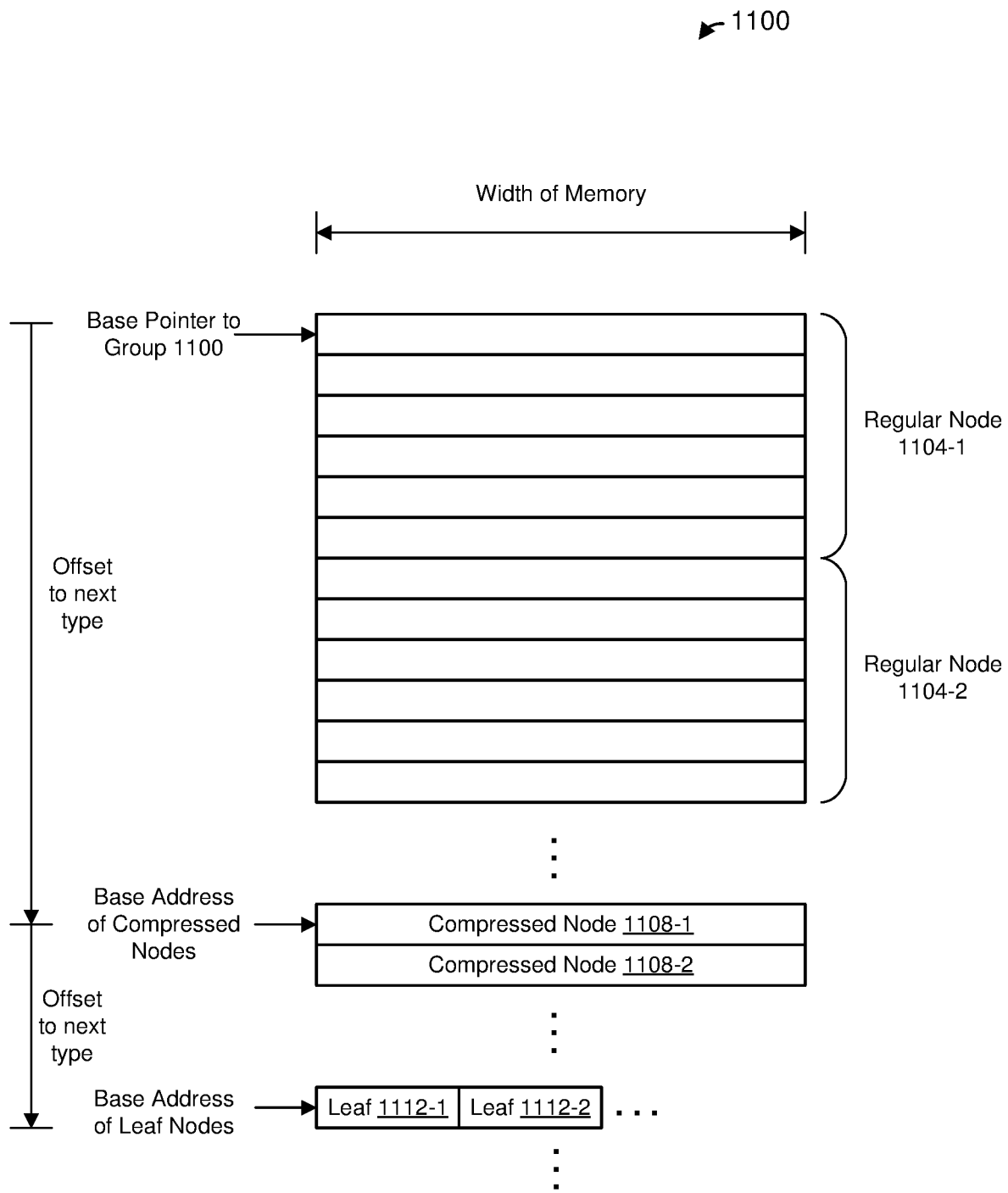
FIG. 11 is a diagram of an example group of nodes stored in consecutive locations in a memory of a network device, according to an embodiment.

Referring again to FIG. 2, child nodes in a trie data structure are arranged in groups of nodes, according to an embodiment. FIG. 11 is a diagram of an example group of nodes 1100, according to an embodiment. The group of nodes 1100 is structured so that nodes of a same type are grouped together and stored in consecutive locations (e.g., lines) in the trie node memory 140 (FIG. 1), according to an embodiment. For example, the group 1100 includes one or more regular nodes 1104 stored in consecutive locations (e.g., lines) in the trie node memory 140. In an embodiment, each regular node 1104 has a format such as the example regular node format discussed with reference to FIG. 7, or another suitable format. After the regular nodes 1104, the group 1100 includes one or more compressed nodes 1108 stored in consecutive locations (e.g., lines) in the trie node memory 140. In an embodiment, each compressed node 1108 has a format such as the example compressed node formats discussed with reference to FIGS. 8 and 9A-C, or another suitable format. After the compressed nodes 1108, the group 1100 includes one or more leaf nodes 1112 stored in one or more consecutive locations (e.g., lines) in the trie node memory 140. In an embodiment, each leaf node 1112 has a format such as the example leaf node format discussed with reference to FIG. 10, or another suitable format.

As discussed with reference to FIGS. 7-9C, regular and compressed nodes include pointer information regarding child nodes. In an embodiment, pointer information in regular or compressed nodes include base pointers to groups of nodes, such as the group of nodes 1100. As an illustrative example, pointer information 720-1 (FIG. 7) in regular node 700 includes a base pointer to the group 1100, according to an embodiment. As another illustrative example, pointer information 832 (FIG. 8) in compressed node 800 includes a base pointer to the group 1100, according to an embodiment.

When nodes are arranged in groups of nodes such as the group 1100, a pointer to a child node is determined using a base pointer to the group. For example, as discussed previously, the LPM engine 124 determines (e.g., the child node address calculator 148 determines) a pointer to a child node using a base pointer to a group of nodes that includes the child node. Referring now to FIGS. 7 and 11, as discussed previously, the LPM engine 124 determines a tuple in a field 716 that corresponds to a portion of a network address of a packet. Then, the LPM engine 124 determines (e.g., the child node address calculator 148 determines) a child type corresponding to the determined tuple in the field 716 (if the determined tuple is NZ) based on the value stored in the determined tuple, or if the determined tuple is Z based on a first NZ tuple to the left of the determined tuple in the field 716.

According to an embodiment, if the child type is regular, the LPM engine 124 determines (e.g., the child node address calculator 148 determines) a pointer to the child node as follows. First, the LPM engine 124 counts (e.g., the child node address calculator 148 counts) a number of NZ tuples in the field 716 set to a value corresponding to the regular type that are to the left of the determined tuple (if the determined tuple is NZ), or if the determined tuple is Z counts a number of NZ tuples set to the regular type value that are to the left of the first NZ tuple to the left of the determined tuple. Such a count is referred to herein as "number of regular children to left".

Then, the pointer to regular child node is calculated by the LPM engine 124 (e.g., by the child node address calculator 148) according to:

$$\text{Address}=\text{base address of group}+x^*\text{<\#of regular children to left>} \qquad \text{Equ. 1}$$

where x is a parameter that specifies how many lines of memory each regular node spans. For instance, in embodiments in which each regular node spans six lines of memory, the parameter x is six. The term "$x^*$<#of regular children to left>" in Equ. 1 corresponds to an offset from the base address of the group.

According to an embodiment, if the child type is compressed, the LPM engine 124 determines (e.g., the child node address calculator 148 determines) a pointer to the child node as follows. The LPM engine 124 counts (e.g., the child node address calculator 148 counts) a number of NZ tuples in the field 716 set to the regular type value. Such a count is referred to herein as "total number of regular children". Additionally, the LPM engine 124 counts (e.g., the child node address calculator 148 counts) a number of NZ tuples in the field 716 set to a value corresponding to the compressed type that are to the left of the determined tuple (if the determined tuple is NZ), or if the determined tuple is Z counts a number of NZ tuples set to the compressed type value that are to the left of the first NZ tuple to the left of the determined tuple. Such a count is referred to herein as "number of compressed children to left".

Then, the pointer to compressed child node is calculated by the LPM engine 124 (e.g., by the child node address calculator 148) according to:

$$\text{Address}=\text{base address of compressed nodes}+\text{<\#of compressed children to left>} \qquad \text{Equ. 2}$$

The base address of compressed nodes corresponds to:

$$\text{base address of compressed nodes}=\text{base address of group}+x^*\text{<total \#of regular children>} \qquad \text{Equ. 3}$$

The term "x*<#of compressed children to left>" in Equ. 2 corresponds to an offset from the base address of compressed nodes in the group, according to an embodiment. In another embodiment, a sum of "x*<total #of regular children>" and "x*<#of compressed children to left>" corresponds to an offset from the base address of the group.

According to an embodiment, if the child type is leaf, the LPM engine 124 determines (e.g., the child node address calculator 148 determines) a pointer to the leaf node by the LPM engine 124 counting the total number of regular children as discussed above. Additionally, the LPM engine 124 counts (e.g., the child node address calculator 148 counts) a number of NZ tuples in the field 716 set to the compressed type value. Such a count is referred to herein as "total number of compressed children". Additionally, the LPM engine 124 counts (e.g., the child node address calculator 148 counts) a number of NZ tuples in the field 716 set to a value corresponding to the leaf type that are to the left of the determined tuple (if the determined tuple is NZ), or if the determined tuple is Z counts a number of NZ tuples set to the leaf type value that are to the left of the first NZ tuple to the left of the determined tuple. Such a count is referred to herein as "number of leaves to left".

Then, a pointer to a memory location (e.g., line) in which the leaf node is located is calculated by the LPM engine 124 (e.g., by the child node address calculator 148) according to:

Line Address=base address of leaf nodes+Round_Down(#of leaves to left/y)   Equ. 4 where y is a parameter that specifies a maximum number of leaf nodes that may be stored in a single memory location (e.g., line). For instance, in embodiments in which a maximum of five leaf nodes may be stored in a single memory location (e.g., line), the parameter y is five.

A subpointer to a particular leaf node within the memory location (e.g., line) is calculated by the LPM engine 124 (e.g., by the child node address calculator 148) according to:

Subpointer=<#of leaves to left>% y   Equ. 5 where % is a modulo operation.

The base address of leaf nodes corresponds to:

base address of leaf nodes=base address of group+
x*<total #of regular children>+<total #of compressed children>   Equ. 6

The term "Round_Down(#of leaves to left/y)" in Equ. 4 corresponds to an offset from the base address of leaf nodes in the group, according to an embodiment. In another embodiment, a combination of "Round_Down(#of leaves to left/y)" and the term "<#of leaves to left> % y" from Equ. 5, corresponds to an offset from the base address of leaf nodes in the group.

In another embodiment, a sum of "x*<total #of regular children>", "x*<total #of compressed children>", and "Round_Down(#of leaves to left/y)", corresponds to an offset from the base address of the group. In another embodiment, a sum of "x*<total #of regular children>", "x*<total #of compressed children>", and "Round_Down (#of leaves to left/y)", in combination with the term "<#of leaves to left> % y" from Equ. 5, corresponds to an offset from the base address of the group.

Figure 12:
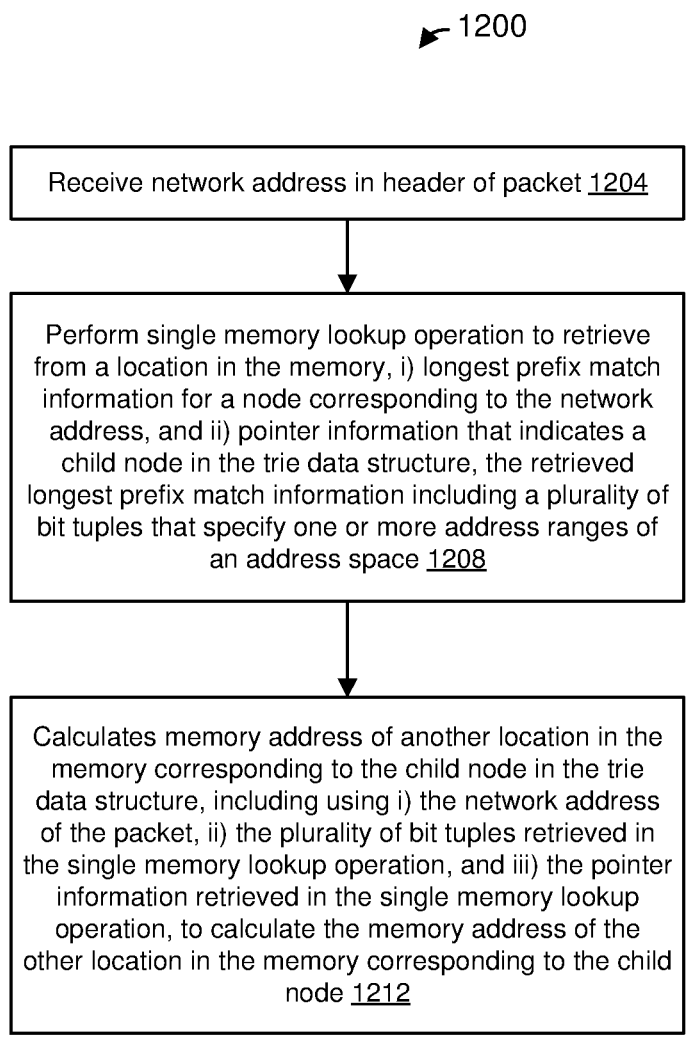
FIG. 12 is a flow diagram of an example method for forwarding packets according to longest prefix matches of network addresses in the packets, according to an embodiment.

FIG. 12 is a flow diagram of an example method 1200 for forwarding packets according to longest prefix matches of network addresses in the packets, according to an embodiment. The method 1200 is implemented by the network device 100, according to an embodiment, and is described with reference to FIG. 1 for ease of explanation. In other embodiments, however, the method 1200 is implemented by another suitable network device, such as a device having a memory configured to store a plurality of entries in respective locations in the memory, the plurality of entries corresponding to a trie data structure for performing a longest prefix match search, each of at least some of the stored entries including: longest prefix match information for a node in the trie data structure, and pointer information for one or more other nodes in the trie data structure.

At block 1204, a network device receives a network address in a header of a packet. For example, the network device 100 receives a packet via one of the network interfaces 132, and retrieves header information from the packet, the header information including the network address, according to an embodiment. As another example, the LPM engine 124 receives the network address of a packet in conjunction with performing an LPM search for the packet, according to an embodiment. In an embodiment, the network address is an IP address. In other embodiments, the network address is another suitable type of network address other than an IP address.

At block 1208, the network device performs a single memory lookup operation to retrieve from a location in the memory, i) longest prefix match information for a node corresponding to the network address, and ii) pointer information that indicates a child node in the trie data structure. In an embodiment, the retrieved longest prefix match information includes a plurality of bit tuples that specify one or more address ranges of an address space. For example, the LPM engine 124 performs (e.g., the trie node memory access engine 144 performs) a single memory lookup operation to retrieve from a location in the trie node memory 140, i) longest prefix match information for a node corresponding to the network address, and ii) pointer information that indicates a child node in the trie data structure.

At block 1212, the network device calculates a memory address of another location in the memory corresponding to the child node in the trie data structure. In an embodiment, calculating the memory address at block 1212 includes using i) the network address of the packet, ii) the plurality of bit tuples retrieved in the single memory lookup operation, and iii) the pointer information retrieved in the single memory lookup operation, to calculate the memory address of the other location in the memory corresponding to the child node.

In some embodiments, each bit tuple indicates i) whether the bit tuple corresponds to a child node, and ii) when the bit tuple corresponds to a child node, a type, among a plurality of node types, of the child node, the plurality of node types including at least a first type that has no child nodes, and a second type that has at least one child node.

In an embodiment, calculating the memory address at block 1212 includes using child node type information indicated by bit tuples in the plurality of bit tuples to calculate the memory address of the other location in the memory corresponding to the child node. In another embodiment, calculating the memory address at block 1212 includes determining one or more counts of one or more node types indicated by the plurality of bit tuples in the retrieved longest prefix match information; and using the one or more counts to calculate the memory address of the other location in the memory corresponding to the child node.

In another embodiment, calculating the memory address at block 1212 includes: determining a first bit tuple, within the plurality of bit tuples, that corresponds to the network address of the packet; determining a node type that corresponds to the network address of the packet using the plurality of bit tuples; determining a first count of bit tuples i) located to one side of the first bit tuple within the plurality of bit tuples, and ii) having a value corresponding to the determined node type; and using the first count to calculate the memory address of the other location in the memory corresponding to the child node.

In another embodiment, the determined node type that corresponds to the network address of the packet is the first type; and calculating the memory address at block 1212 includes: determining a second count of bit tuples in the plurality of bit tuples having a value corresponding to the second type, and using the second count to calculate the memory address of the other location in the memory corresponding to the child node.

In some embodiments, each bit tuple consists of two bits, and when the bit tuple corresponds to a child node, the two bits indicate one of at least three types of child nodes. In an illustrative embodiment, the two bits are set to zero to indicate that the bit tuple does not correspond to a child node.

In some embodiments, the memory is configured to store groups of child nodes, each of at least some of the groups comprising child nodes stored in consecutive locations in the memory, and the each of at least some of the groups comprising respective subgroups of child nodes of respective same node types; the pointer information retrieved in the single memory lookup operation indicates an address of one of the groups of child nodes; and calculating the memory address at block 1212 includes, when the child node is of the second node type: calculating a first offset from the address of the one group of child nodes to a base address of child nodes of the second type within the group using the plurality of bit tuples retrieved in the single memory lookup operation, and calculating a second offset from the base address of child nodes of the second type using i) the network address of the packet, and ii) the plurality of bit tuples retrieved in the single memory lookup operation.

In some embodiments, the memory is configured to store groups of child nodes, each of at least some of the groups comprising child nodes stored in consecutive locations in the memory; the pointer information retrieved in the single memory lookup operation indicates an address of one of the groups of child nodes; and calculating the memory address at block 1212 includes: calculating an offset from the address of the one group of child nodes using i) the network address of the packet, and ii) the plurality of bit tuples retrieved in the single memory lookup operation.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions are stored in a memory device(s) such as a random access memory (RAM), a read only memory (ROM), a Flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device that forwards packets according to longest prefix matches of network addresses in the packets, the network device comprising:
    a memory configured to store a plurality of entries in respective locations in the memory, the plurality of entries corresponding to a trie data structure for performing a longest prefix match search, each of at least some of the stored entries including:
        longest prefix match information for a node in the trie data structure, and
        pointer information for one or more other nodes in the trie data structure; and
    a forwarding engine configured to forward packets according to longest prefix matches of network addresses in the packets, the forwarding engine comprising:
        a memory access engine configured to retrieve from a location in the memory, in a single memory lookup operation, i) longest prefix match information for a node corresponding to a network address in a header of a packet, and ii) pointer information that indicates a child node in the trie data structure, wherein the retrieved longest prefix match information includes a plurality of multi-bit tuples that specify one or more address ranges of an address space, each multi-bit tuple having a respective set of adjacent bits within the longest prefix match information, and
        a child node address calculator configured to use information indicated by one multi-bit tuple, from among the plurality of multi-bit tuples, to select a formula from among multiple different formulas for calculating a memory address of another location in the memory corresponding to the child node in the trie data structure, and to use i) the network address of the packet, ii) the plurality of multi-bit tuples retrieved in the single memory lookup operation, iii) the pointer information retrieved in the single memory lookup operation, and iv) the selected formula, to calculate the memory address of the another location in the memory corresponding to the child node in the trie data structure.

2. The network device of claim 1, wherein:
    each multi-bit tuple indicates i) whether multi-bit tuple corresponds to a child node, and ii) when the multi-bit tuple corresponds to a child node, a type, among a plurality of node types, of the child node, the plurality of node types including at least a first type that has no child nodes, and a second type that has at least one child node; and
    the child node address calculator configured to further use child node type information indicated by the one multi-bit tuple to select the formula for calculating the memory address of the other location in the memory corresponding to the child node.

3. The network device of claim 2, wherein the child node address calculator is configured to:
    determine one or more counts of one or more node types indicated by the plurality of multi-bit tuples in the retrieved longest prefix match information; and
    use the one or more counts to calculate the memory address of the other location in the memory corresponding to the child node.

4. The network device of claim 2, wherein the child node address calculator is configured to:
- determine the one multi-bit tuple as a first multi-bit tuple, within the plurality of multi-bit tuples, that corresponds to the network address of the packet;
- determine a node type that corresponds to the network address of the packet using the first multi-bit tuple;
- determine a first count of multi-bit tuples i) located to one side of the first multi-bit tuple within the plurality of multi-bit tuples, and ii) having a value corresponding to the determined node type; and
- use the first count to calculate the memory address of the other location in the memory corresponding to the child node.

5. The network device of claim 4, wherein:
the determined node type that corresponds to the network address of the packet is the first type; and
the child node address calculator is configured to:
- determine a second count of multi-bit tuples in the plurality of multi-bit tuples having a value corresponding to the second type, and
- use the second count to calculate the memory address of the other location in the memory corresponding to the child node.

6. The network device of claim 2, wherein:
each multi-bit tuple consists of two bits, and
when the multi-bit tuple corresponds to a child node, the two bits indicate one of at least three different types of child nodes.

7. The network device of claim 2, wherein:
the memory is configured to store groups of child nodes, each of at least some of the groups comprising child nodes stored in consecutive locations in the memory, and the each of at least some of the groups comprising respective subgroups of child nodes of respective same node types;
the pointer information retrieved in the single memory lookup operation indicates an address of one of the groups of child nodes; and
the child node address calculator configured to, when the child node is of the second node type:
- calculate a first offset from the address of the one group of child nodes to a base address of child nodes of the second type within the group using the plurality of multi-bit tuples retrieved in the single memory lookup operation, and
- calculate a second offset from the base address of child nodes of the second type using i) the network address of the packet, and ii) the plurality of multi-bit tuples retrieved in the single memory lookup operation.

8. The network device of claim 1, wherein:
the memory is configured to store groups of child nodes, each of at least some of the groups comprising child nodes stored in consecutive locations in the memory;
the pointer information retrieved in the single memory lookup operation indicates an address of one of the groups of child nodes; and
the child node address calculator is configured to calculate an offset from the address of the one group of child nodes using i) the network address of the packet, and ii) the plurality of multi-bit tuples retrieved in the single memory lookup operation, and using the selected formula.

9. The network device of claim 1, further comprising:
a plurality of network interfaces configured to couple to a plurality of network links.

10. The network device of claim 1, wherein:
the one multi-bit tuple indicates a type, from among multiple different node types, of the child node; and
the multiple different formulas correspond to respective node types.

11. A method in a network device for forwarding packets according to longest prefix matches of network addresses in the packets, the network device having a memory configured to store a plurality of entries in respective locations in the memory, the plurality of entries corresponding to a trie data structure for performing a longest prefix match search, each of at least some of the stored entries including: i) longest prefix match information for a node in the trie data structure, and ii) pointer information for one or more other nodes in the trie data structure, the method comprising:
receiving, at the network device, a network address in a header of a packet;
performing a single memory lookup operation to retrieve from a location in the memory, i) longest prefix match information for a node corresponding to the network address, and ii) pointer information that indicates a child node in the trie data structure, wherein the retrieved longest prefix match information includes a plurality of multi-bit tuples that specify one or more address ranges of an address space, each multi-bit tuple having a respective set of adjacent bis within the longest prefix match information; and
calculating, at the network device, a memory address of another location in the memory corresponding to the child node in the trie data structure, including using information indicated by one multi-bit tuple, from among the plurality of multi-bit tuples, to select a formula from among multiple different formulas for calculating a memory address of another location in the memory corresponding to the child node in the trie data structure, and using i) the network address of the packet, ii) the plurality of multi-bit tuples retrieved in the single memory lookup operation, iii) the pointer information retrieved in the single memory lookup operation, and iv) the selected formula to calculate the memory address of the other location in the memory corresponding to the child node.

12. The method of claim 11, wherein:
each multi-bit tuple indicates i) whether the multi-bit tuple corresponds to a child node, and ii) when the multi-bit tuple corresponds to a child node, a type, among a plurality of node types, of the child node, the plurality of node types including at least a first type that has no child nodes, and a second type that has at least one child node; and
calculating the memory address of the other location in the memory corresponding to the child node comprises using child node type information indicated by the one multi-bit tuple to select the formula for calculating the memory address of the other location in the memory corresponding to the child node.

13. The method of claim 11, wherein calculating the memory address of the other location in the memory corresponding to the child node includes:
determining one or more counts of one or more node types indicated by the plurality of multi-bit tuples in the retrieved longest prefix match information; and
using the one or more counts to calculate the memory address of the other location in the memory corresponding to the child node.

14. The method of claim 12, wherein calculating the memory address of the other location in the memory corresponding to the child node includes:

determining the one multi-bit tuple as a first multi-bit tuple, within the plurality of multi-bit tuples, that corresponds to the network address of the packet;

determining a node type that corresponds to the network address of the packet using the first multi-bit tuple;

determining a first count of multi-bit tuples i) located to one side of the first multi-bit tuple within the plurality of multi-bit tuples, and ii) having a value corresponding to the determined node type; and using the first count to calculate the memory address of the other location in the memory corresponding to the child node.

15. The method of claim 14, wherein:

the determined node type that corresponds to the network address of the packet is the first type; and calculating the memory address of the other location in the memory corresponding to the child node includes:
 determining a second count of multi-bit tuples in the plurality of multi-bit tuples having a value corresponding to the second type, and
 using the second count to calculate the memory address of the other location in the memory corresponding to the child node.

16. The method of claim 12, wherein:

each multi-bit tuple consists of two bits, and when the multi-bit tuple corresponds to a child node, the two bits indicate one of at least three different types of child nodes.

17. The method of claim 12, wherein:

the memory is configured to store groups of child nodes, each of at least some of the groups comprising child nodes stored in consecutive locations in the memory, and the each of at least some of the groups comprising respective subgroups of child nodes of respective same node types;

the pointer information retrieved in the single memory lookup operation indicates an address of one of the groups of child nodes; and calculating the memory address of the other location in the memory corresponding to the child node includes, when the child node is of the second node type:
 calculating a first offset from the address of the one group of child nodes to a base address of child nodes of the second type within the group using the plurality of multi-bit tuples retrieved in the single memory lookup operation, and
 calculating a second offset from the base address of child nodes of the second type using i) the network address of the packet, and ii) the plurality of multi-bit tuples retrieved in the single memory lookup operation.

18. The method of claim 11, wherein:

the memory is configured to store groups of child nodes, each of at least some of the groups comprising child nodes stored in consecutive locations in the memory;

the pointer information retrieved in the single memory lookup operation indicates an address of one of the groups of child nodes; and calculating the memory address of the other location in the memory corresponding to the child node includes calculating an offset from the address of the one group of child nodes using i) the network address of the packet, and ii) the plurality of multi-bit tuples retrieved in the single memory lookup operation, and using the selected formula.

19. The method of claim 11, wherein:

the one multi-bit tuple indicates a type, from among multiple different node types, of the child node; and the multiple different formulas correspond to respective node types.

* * * * *